United States Patent [19]
Grochowski

[11] Patent Number: 5,647,597
[45] Date of Patent: Jul. 15, 1997

[54] RETRACTABLE SEAL FOR OIL-FILLED ROTATING MACHINE

[75] Inventor: Edwin Thomas Grochowski, Howell, Mich.

[73] Assignee: General Motors Corporation, Detroit, Mich.

[21] Appl. No.: 577,395

[22] Filed: Dec. 22, 1995

[51] Int. Cl.[6] .................................................. F16J 15/32
[52] U.S. Cl. ........................ 277/8; 277/9; 277/153; 403/12; 403/288; 403/359; 464/16
[58] Field of Search ............................. 277/9, 9.5, 11, 277/8, 32, 98, 99, 152, 153; 464/16; 403/12, 288, 359

[56] References Cited

U.S. PATENT DOCUMENTS

| | | | |
|---|---|---|---|
| 2,919,939 | 1/1960 | Adresen et al. | 277/8 |
| 3,072,413 | 1/1963 | Parks | 277/8 |
| 3,337,221 | 8/1967 | Hulsebus | 277/8 |
| 3,577,746 | 5/1971 | Dolan | 464/16 |
| 3,621,937 | 11/1971 | Edge | 464/16 |
| 4,081,218 | 3/1978 | Geabriel | 277/9 |
| 4,817,846 | 4/1989 | Eichinger | 277/9 |
| 5,224,762 | 7/1993 | Levenstein | 277/9 |
| 5,244,215 | 9/1993 | Cather, Jr. et al. | 277/9 |

*Primary Examiner*—Scott Cummings
*Attorney, Agent, or Firm*—Charles E. Leahy

[57] ABSTRACT

A rotating machine has a splined primary shaft rotatably mounted in an opening of an oil-filled housing and a primary seal carried by the housing for sealing with a mating secondary splined shaft upon insertion of the secondary shaft into the housing opening for mating with the primary shaft. A retractable member is carried by the primary shaft for sealing with the primary seal to maintain the oil within the housing prior to the insertion of the secondary shaft and prevent the flow of oil to the spline. Upon insertion of the secondary shaft through the housing opening, the secondary shaft seals with the primary seal to prevent leakage from the housing. Furthermore, the secondary shaft forcibly retracts the retractable member away from the primary seal and establishes a flow path around the retractable member to the secondary shaft so that oil flows to the mating splines of the shafts.

7 Claims, 2 Drawing Sheets

RETRACTABLE SEAL FOR OIL-FILLED ROTATING MACHINE

The invention relates to a retractable seal structure for normally sealing a housing opening through which a splined primary shaft extends and which opens oil flow communication to the splines only after a secondary splined shaft has been engaged with the primary shaft.

BACKGROUND OF THE INVENTION

It is well known in rotating machines such as an automotive transmissions to provide a housing in which gear mechanisms are provided to control the speed and direction of a splined primary shaft. The splined primary shaft is aligned with an opening in the housing to permit the mating of the splined primary shaft with the splined secondary shaft.

Because the gearing of the transmission must be lubricated, it is well known to fill the housing with oil or other suitable lubricant. In order to prevent leakage from the housing, it is well known to mount a primary seal within the opening of the housing to engage with the splined secondary shaft upon insertion thereof to thereby establish the oil tight integrity of the transmission housing. It has been recognized in the prior art that this construction prevents filling of the transmission housing with oil until after the secondary shaft has been installed to engage with the primary seal.

Accordingly, the prior art also teaches the provision of a annular cup which is press fit onto the splined primary shaft and reaches through the housing opening to engage with the primary seal thereby establishing oil tight integrity of the transmission housing even before the secondary shaft is mated with the splined primary shaft. Although this prior art construction serves to retain oil within the transmission housing, the splined end of the primary shaft is not bathed in oil, and, accordingly the connection between the splined primary and secondary shafts must be packed with grease to assure proper lubrication over the life of the rotating machine.

It would be desirable to provide a seal arrangement which would both permit filling of the transmission oil prior to insertion of the splined secondary shaft, and also assure flow of oil to the splined connection between the splined primary shaft and the mating splined secondary shaft to assure lubrication thereof.

SUMMARY OF THE INVENTION

According to the present invention, a rotating machine has a splined primary shaft rotatably mounted in an opening of an oil-filled housing and a primary seal carried by the housing for sealingly engaging with a mating splined shaft upon insertion of the secondary shaft into the housing opening for engagement with the splined primary shaft. A retractable member is carried by the splined primary shaft for sealing engagement with the primary seal to maintain the oil within the housing prior to the insertion of the secondary shaft. The retractable member seals between an unsplined portion of the splined primary shaft and the primary seals, thereby preventing the flow of oil to the spline. Upon insertion of the secondary shaft through the housing opening, the mating secondary shaft seals with the primary seal to prevent leakage from the housing. Furthermore, the secondary shaft forcibly retracts the retractable member away from the primary seal and establishes a flow path around the retractable seal to the splined secondary shaft so that oil flows to the mating splines of the shafts. The retractable member preferably includes an annular cup attached to the splined primary shaft, an annular member reciprocably mounted with the annular cup, and a spring urging the annular member to an extended position engaging the primary seal and permitting retraction of the annular member as the splined secondary shaft is inserted into engagement with the primary seal and the splined-mating connection with the splined primary shaft.

DESCRIPTION OF THE PREFERRED EMBODIMENT

Figure 1:
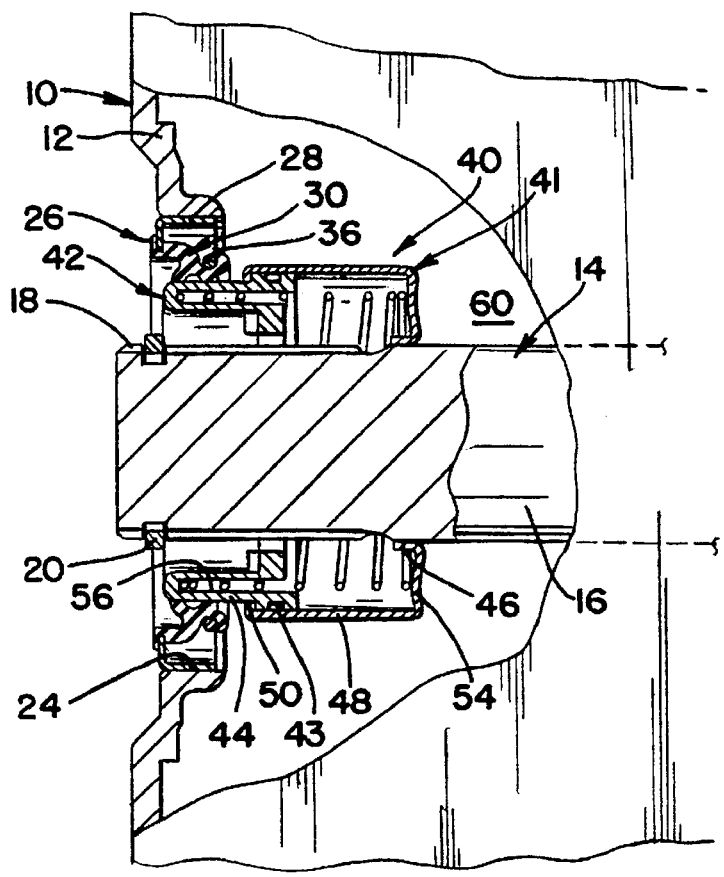
FIG. 1 is an elevation view of a transmission according to the present invention shown with the retractable member mechanism engaging the primary seal to retain fluid within the transmission housing.

Referring to FIG. 1, a rotating machine 10 such as a transmission for a motor vehicle includes a housing 12 in which a splined primary shaft 14 is rotatably mounted and connected to a gear train or other controlling mechanism, not shown. The splined primary shaft 14 has an unsplined portion 16 and an outer end which carries conventional splines 18. A retaining ring 20 seats in a groove at the outermost end of the splined primary shaft 14 to couple with a secondary shaft.

The transmission housing 12 has an oversized opening 24 which registers with the splined primary shaft 14. A primary seal assembly 26 is mounted within the opening 24 and includes a metallic mounting ring 28 and a elastomeric seal element 30. The seal element 30 includes an outer sealing flexible lip 32 and an inner sealing flexible lip 34. The seal element 30 also includes a coil spring 36 which urges radial contraction of the seal element 30.

Figure 2:
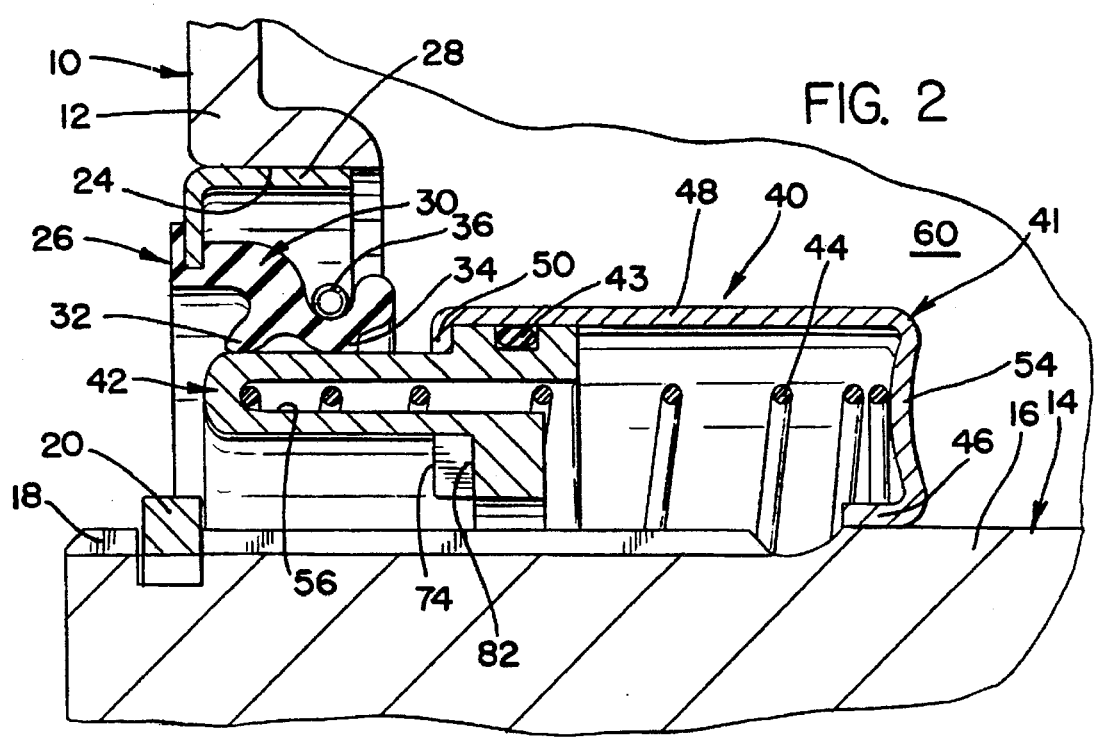
FIG. 2 is an enlarged fragmentary view of FIG. 1.

A retractable member assembly 40, best seen in FIG. 2, is provided to seal the annular space between the splined primary shaft 14 and the primary seal 26. The retractable assembly 40 includes an annular retainer cup 41, an annular member 42, an O-ring 43 and a coil compression spring 44. The retainer cup 41 is preferably of stamped steel construction and includes an axial wall 46 which is press fit onto the unsplined portion 16 of the splined primary shaft 14. The retainer cup 41 also includes an axial extending wall 48 which terminates at a radially interned flange 50. The annular member 42 encircles the splined shaft 14 and is captured inside the retainer cup 40 for axial movement between the extended position of FIG. 2 and a retracted position of FIG. 4. The coil compression spring 44 seats against a radial wall 54 of the retainer cup 41 and has another end seating within an annular groove 56 of the annular member 42. The coil compression spring 44 acts to urge the annular member 42 to the extended position of FIG. 1 in which the annular member 42 is seated against both flexible lips 32 and 34 of the primary seal assembly 26. The O-ring 43 is carried in a groove on the annular member 42 and seals with the axial wall 48 of retainer cup 41.

As seen in FIGS. 1 and 2, the interior of the transmission housing 12 is a cavity 60 which is filled with oil or other suitable lubricant. The primary seal assembly 26 and the retractable assembly 40 cooperate to effectively close off the opening in the housing 24 through which the oil would otherwise leak.

Figure 3:
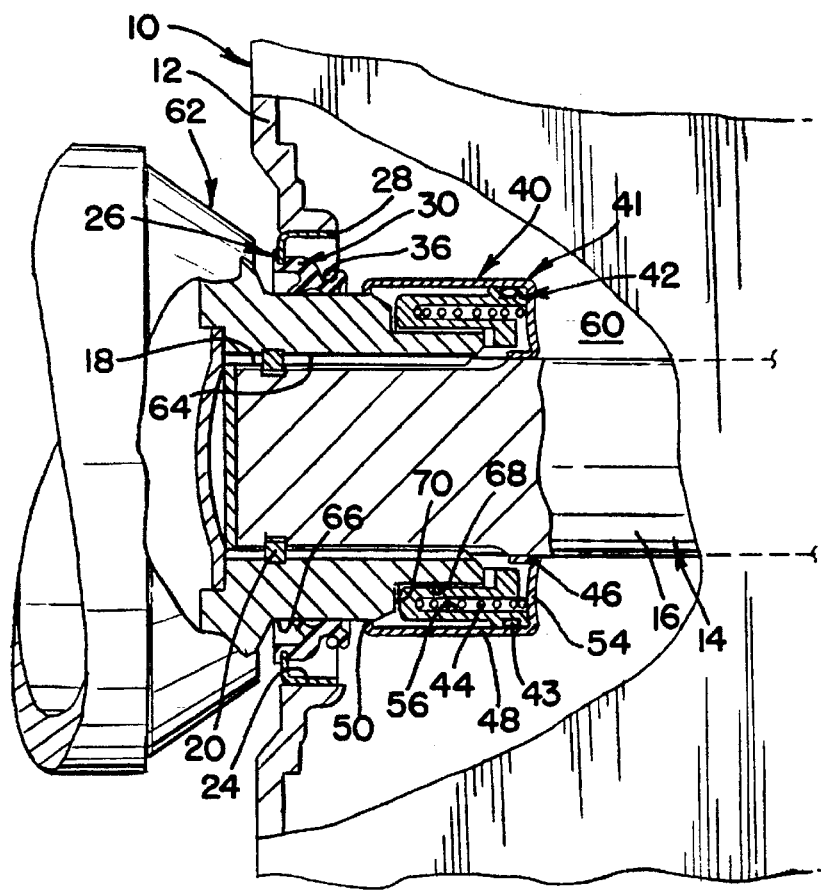
FIG. 3 is a view similar to FIG. 1, but showing the insertion of the splined secondary shaft to engage with the primary shaft and primary seal and simultaneously disengage the retractable member from the primary seal.
Figure 4:
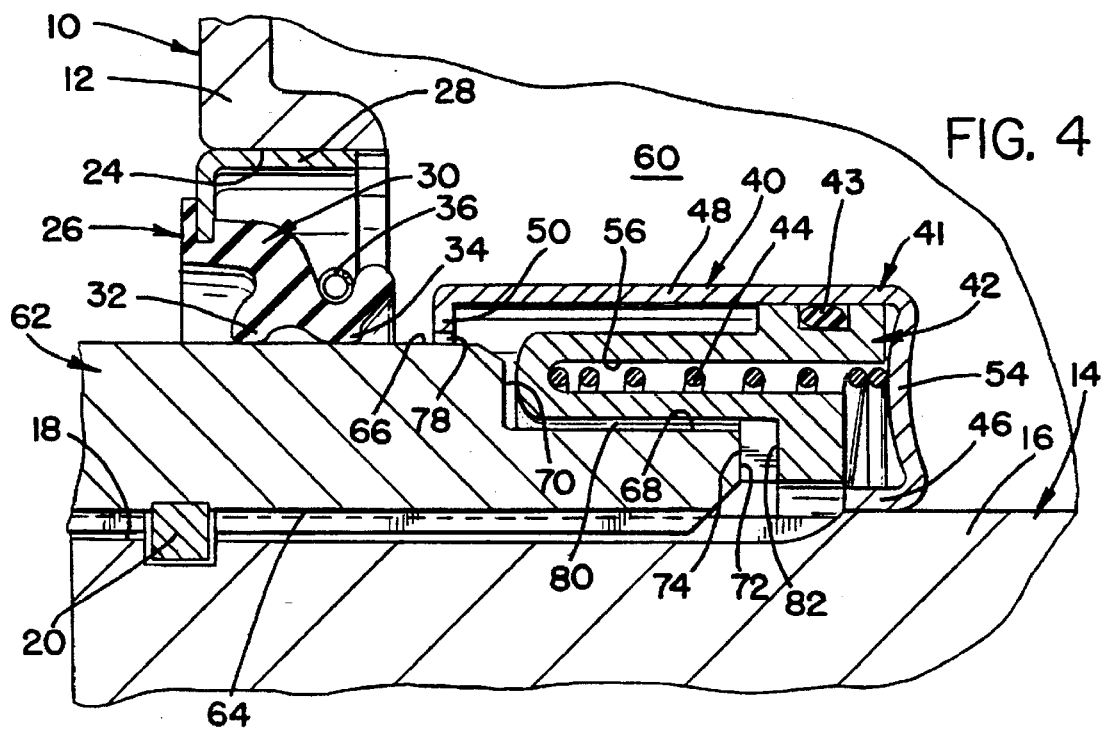
FIG. 4 is an enlarged fragmentary view of FIG. 3.

FIGS. 3 and 4 show the transmission assembly after the insertion of a splined secondary shaft 62 into mating engagement with the splined primary shaft 14. As seen in FIGS. 3 and 4, the splined secondary shaft 62 is an annular tube with internal splines 64 provided on an interior bore thereof. The outer surface of the splined shaft 62 is stepped to provide an outermost circumferential portion 66 and an inner circumferential portion 68 which are formed with a shoulder 70 therebetween. In comparing FIGS. 2 and 4, it will appreciated that the insertion of the secondary splined shaft 62 into the opening 24 of the housing to engage the splines 18 and 64 will first cause an endmost wall 72 of the splined secondary spline shaft 62 to engage with a shoulder 74 of the annular member 42 and begin to retract the annular member 42 rightwardly away from the lip 32 of the primary seal 24. This initial rightward retraction of the annular member 42 permits the outermost circumferential portion 66 of the splined secondary shaft 62 to come into engagement with the outer flexible lip 32 of seal assembly 26 and thereby provide an initial sealing of the annular space 24 between the housing 12 and the splined secondary shaft 62. Upon further insertion of the splined secondary shaft 62, the annular member 42 is retracted further rightwardly and the outermost circumferential portion 66 comes into contact with the inner flexible lip 34 of the primary seal assembly 26. Thus, it will be understood that the mating connection between the splined primary and secondary splined shafts can be obtained without leakage of oil from the cavity 60 of the transmission housing 12.

Referring now to FIGS. 3 and 4, it will be seen that the invention also provides a path of oil flow from the transmission cavity 60 into the splined connection between the splined shafts 14 and 62. In particular, as seen in FIG. 4, the oil is permitted to flow through a gap 78 between the inturned flange 50 of the retainer cup 41 and the outermost circumferential surface 66 of splined secondary shaft 62. The oil flow proceeds through a clearance space 80 provided between the annular seal member 42 and the inner circumferential portion 68 of the splined secondary shaft 62. In addition, it is seen that the shoulder 74 of the annular member 42 has one or more oil port notches 82 provided therein to complete the communication of oil flow to the region between the splines 64 and 18.

Thus, it is seen that the invention provides a new and improved retractable seal assembly which permits the assembly and disassembly of a splined secondary shaft into mating connection with the splined primary shaft of a transmission housing without loss of lubricating oil from the transmission housing.

It will be understood that the retractable seal assembly, as shown and described, is a description of a preferred embodiment as relating to an automotive transmission. However, it is to be understood that the retractable seal assembly for retaining fluid within a housing may be employed in the environment of any rotating machine application in which it is desired to assemble or disassemble splined shafts within an oil-filled housing.

I claim:

1. In a rotating machine having a splined primary shaft rotatably mounted in an opening of an oil filled housing, a primary seal carried by the housing for sealingly engaging with a splined secondary shaft upon insertion of the splined secondary shaft into the opening and into engagement with the splined primary shaft, the improvement comprising:

a retractable member carried by the splined primary shaft for reciprocating axial movement and having sealing engagement with the primary seal to maintain oil within the housing, said retractable member being engaged by the splined secondary shaft upon insertion of the splined secondary shaft through the housing opening and into sealing engagement with the primary seal to forcibly axially retract the retractable member away from sealing engagement with the primary seal.

2. The improvement of claim 1 further comprising said splined primary shaft having an unsplined region and the retractable member being carried on the unsplined portion of the splined primary shaft so that the sealing engagement of the retractable member with the primary seal prevents flow of oil to the spline.

3. The improvement of claim 2 further comprising a flow path established between the retractable member and the splined secondary shaft upon retraction of the retractable member so that oil flows to the engaging splines of the shafts.

4. The improvement of claim 1 in which the retractable member further comprises an annular retainer cup attached to the splined primary shaft, an annular member reciprocably mounted within the annular retainer cup, and spring means urging the annular member to an extended position engaging the primary seal to maintain oil within the housing.

5. The improvement of claim 4 in which the annular member has an integral shoulder which is engaged by the splined secondary shaft upon insertion of the splined secondary shaft into the housing opening to forcibly retract the annular member against the bias of the spring.

6. The improvement of claim 1 in which the primary seal includes first and second spaced apart seal lips sealingly engaged by the retractable member so that the progressive insertion of the splined secondary shaft first retracts the retractable member away from one of the seal lips and engages the splined secondary shaft with the one seal lip and then further retracts the retractable member away from the other seal lip and engages the secondary splined shaft with the other seal lip.

7. In a rotating machine having a primary shaft with an unsplined portion rotatably mounted in an oil filled housing and a splined portion thereof registering with an oversized opening in the housing, a primary seal carried by the housing opening for sealingly engaging with a splined secondary shaft upon insertion of the splined secondary shaft into the opening and into spline-mating engagement with the splined primary shaft, the improvement comprising:

a retractable member carried by the splined primary shaft on an unsplined portion thereof for axial reciprocating movement and sealingly engaging with the primary seal to maintain oil within the housing and prevent oil flow to the splined portion of the primary shaft, said retractable member being engaged by the splined secondary shaft upon insertion of the splined secondary shaft through the housing opening and into sealing engagement with the primary seal to maintain oil within in the housing irrespective of the retraction of the retractable member away from the primary seal and concomitantly open a path of oil flow to the splined portion of the splined primary shaft so that the mating splined between the shafts are bathed in oil.

* * * * *